Figures 1, 2:
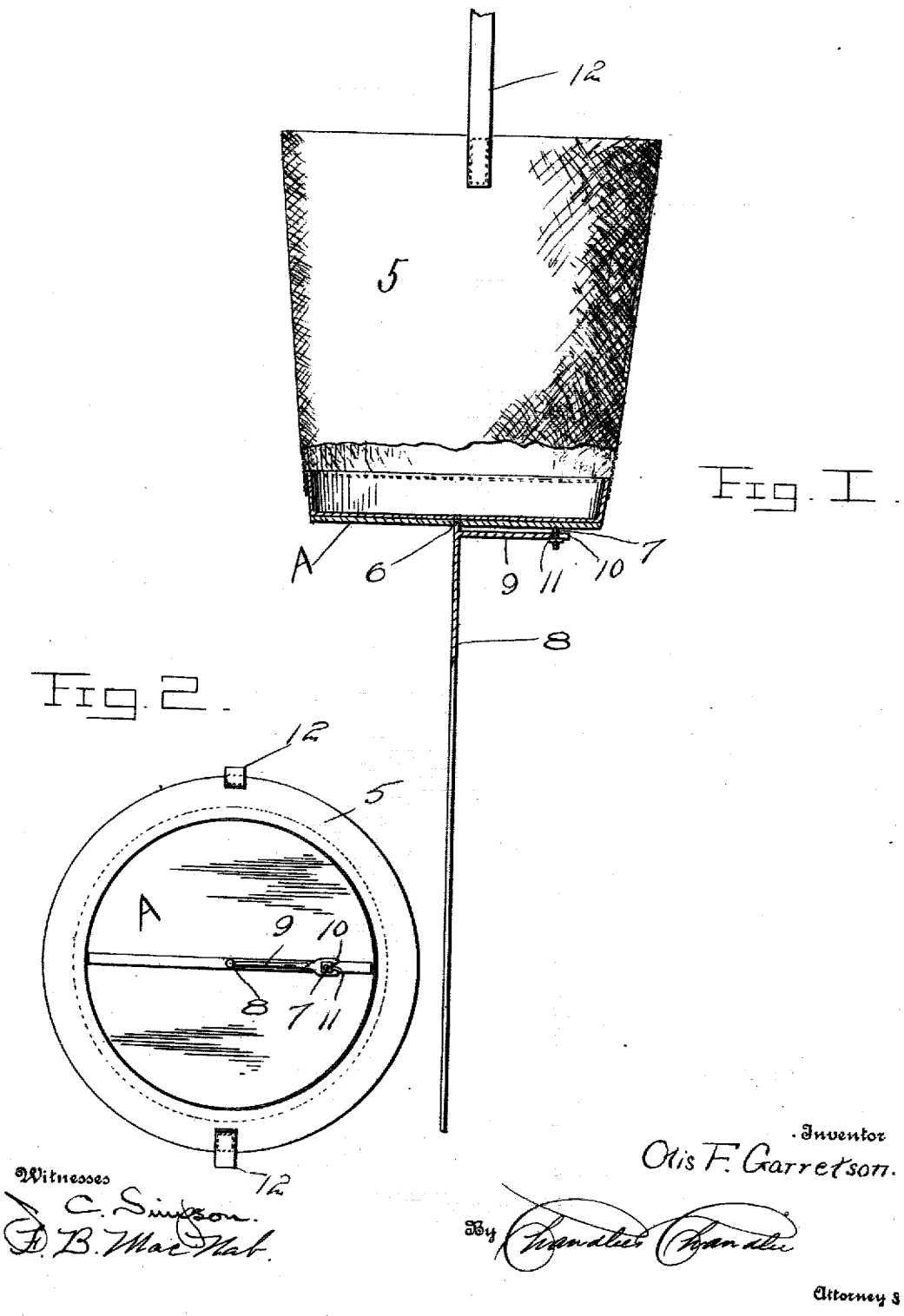

No. 825,452.

PATENTED JULY 10, 1906.

O. F. GARRETSON.
FEED BAG FOR LIVE STOCK.
APPLICATION FILED APR. 18, 1906.

Witnesses
C. Simpson
F. B. MacNab

Inventor
Otis F. Garretson.

By Chandler & Chandler
Attorneys

UNITED STATES PATENT OFFICE.

OTIS F. GARRETSON, OF ELIZABETH, NEW JERSEY.

FEED-BAG FOR LIVE STOCK.

No. 825,452.　　　　Specification of Letters Patent.　　　　Patented July 10, 1906.

Application filed April 18, 1906. Serial No. 312,449.

*To all whom it may concern:*

Be it known that I, OTIS F. GARRETSON, a citizen of the United States, residing at Elizabeth, in the county of Union, State of New Jersey, have invented certain new and useful Improvements in Feed-Bags for Live Stock; and I do hereby declare the following to be a full, clear, and exact description of the invention, such as will enable others skilled in the art to which it appertains to make and use the same.

This invention has relation to feed or nose bags for feeding horses in the street or other places out of the stable.

It is the object of this invention to provide means for supporting the bag so that the horse can reach and eat all of the grain in the bag, avoiding waste and discomfort to the animal while feeding.

My invention consists in attaching a leg or support to the center of the bottom of the bag, so that when the horse lowers his head to get at the food the bag will be stopped by the leg and the animal being able to reach the grain with his lips will gather a mouthful from the bag and not be inclined to toss his head to have the feed thrown to where he can get at it.

The invention will first be described in view of the annexed drawings, forming a part of this specification, and then be particularly pointed out in the claim.

Of the said drawings, Figure 1 is a side elevation of a feeding-bag upon which I have made my improvements, part being in section. Fig. 2 is a bottom plan of the same.

In carrying out my invention I provide a feed-bag 5 of usual and satisfactory form, the body of which may be composed of strong canvas, having a suitable framework A inclosed in hems and fellings of the bag or attached to the fabric in other proper manner in order that the bag may be maintained in good usable shape.

In the framework A at the bottom of the bag 5 I form a suitable socket 6 in a manner that may be satisfactory, and at a central point, or a point approximately the center of the bottom of the bag, as near as possible, so that the said bag may be supported as well as may be, by a single standard or leg extending down from the point of its attachment.

At a short distance to one side of the socket 6 I turn a screw 7 through the framework, so as to have it extend a short distance beyond the bottom surface thereof.

A leg or a supporting-standard 8 of a length suitable for supporting the bag a proper distance from the ground is finally provided, which standard has a lateral arm 9 extending from its upper end, that terminates in a small fork 10, suitable of being looped around the screw 7.

In use I set the upper end of the standard or leg 8 in the socket 6 and engage or loop the fork 10 around the shank of the screw 7 and then turn the nut 11 on the thread of the screw, securing the end of the arm thereto.

The leg or standard 8 may be a bar of iron just thick enough not to bend under the weight of the bag and its contents.

It is repeated that the bag proper may be of any satisfactory form and size and may be provided with a strap or rope 12 to go over the head or neck of the horse to keep the bag in place.

It is designed to make the supports detachable, so that the device when completed will be readily portable and not more cumbersome than is necessary.

The lateral arm on the standard serves to keep the bag from swinging around on the upper end of the standard.

It is to be understood that I do not desire to be limited to the exact details of construction shown and described, for obvious modifications will occur to a person skilled in the art.

What is claimed is—

A feed-bag having a socket formed in its bottom at a central point, a screw turned through the bottom at a point to one side of the center, a supporting-standard engaging the socket at its upper end, a lateral arm connected at one end to the standard and extending laterally under the bag, its outer end engaging the shank of said screw, to which it is suitably secured.

In testimony whereof I affix my signature in presence of two witnesses.

OTIS F. GARRETSON.

Witnesses:
　SAMUEL R. OGDEN,
　A. L. DE PUE.